Dec. 31, 1957  F. OSTWALD ET AL  2,818,138
BRAKE SYSTEM FOR TRAINS OF VEHICLES
Filed Aug. 9, 1955
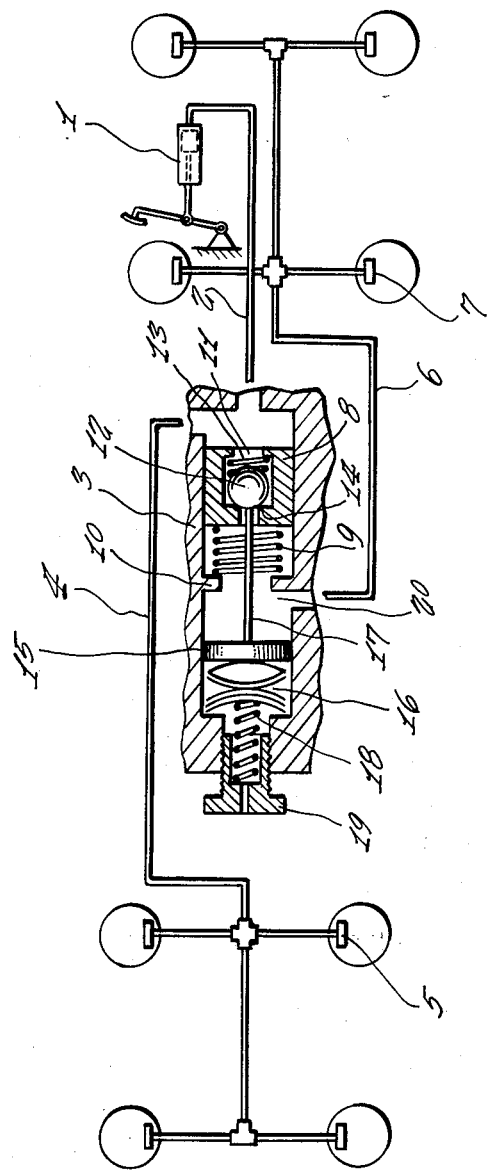
INVENTORS
FRITZ OSTWALD
& ULLRICH BAUMGARTEN
BY
WESTERN & ERLY United States Patent Office 2,818,138
Patented Dec. 31, 1957

2,818,138

BRAKE SYSTEM FOR TRAINS OF VEHICLES

Fritz Ostwald, Heppenheim, Bergstrasse, and Ulrich Baumgarten, Frankfurt am Main, Germany, assignors to Alfred Teves Machinen und Armaturenfabrik KG, Frankfurt am Main, Germany Application August 9, 1955, Serial No. 527,396

4 Claims. (Cl. 188—3)

The invention relates to a brake system for trains of vehicles. The braking of a train of several intercoupled vehicle units presents difficulties because the trailer vehicle or vehicles tend to keep overtaking the foremost or tractor vehicle. By this pulling and pushing, the coupling parts are subjected to severe internal stresses, with resulting impairment of safety. This manifestation appears equally if the tractor vehicle is braked too hard and if the tractor and trailer vehicles are decelerated at the same rate. It is known that this difficulty may be met by imparting a so-called lead to the brakes of the trailer vehicle or vehicles, i. e. by causing the brake system to function with a time lag such that the trailer brake will respond to the controls sooner than the tractor brake. This expedient merely serves to keep the train in pull in the critical interval, i. e. at the commencement of braking, and this at the sacrifice of brake reaction time on the tractor vehicle, which may be badly needed in emergencies.

To eliminate this disadvantage, a brake system is here proposed wherein the train is always kept in pull, and moreover a simultaneous response of tractor and trailer brakes is provided upon actuation of the controls. In the system according to the invention, a pressure regulator is provided between the tractor- and trailer-vehicle brake systems. The essence of the invention consists in that a pressure regulator having a non-linear, that is, a progressive or degressive characteristic curve, is used, which under low brake pressures generates a greater braking force on the trailer than on the tractor vehicle. The pressure regulator, depending on the arrangement, may be either a pressure booster or a pressure reducer.

The device according to the invention will now be more fully described with reference to the accompanying drawings, but it should be understood that these are given by way of illustration and not of limitation and that many changes in the details may be made without departing from the spirit of the invention.

In the drawing,

The drawing is a diagram of a brake system according to the invention, with pressure regulator embodied as a pressure reducer and shown in section.

The invention will now be described in detail. Arriving from source of pressure 1, a line 2 is connected to a pressure regulator 3. The line 4 passing on from pressure regulator 3 transmits the brake pressure generated by the source 1 to the trailer brake cylinders 5 without step-up. Line 6 supplies the tractor brake cylinder 7 with the pressure as stepped down by the pressure regulator. In the pressure regulator 3, a slidable control member or piston 8 is provided which rests on a shoulder 10 of the casing with interposition of a spring 9. The control member 8 has a bore 11 in which a closure member 12, in the present embodiment a ball, is pressed by spring 13 on seat 14. Following the branch to line 6 leading to the tractor brake cylinders 7, a displaceable piston 15 is provided in the pressure regulator casing, supported against the casing with interposition of a spring complex 16. Piston 15 bears a rod 17 capable of lifting closure member 12 from its seat 14. The spring complex 16 rests in part on a shoulder in the casing and in part on a spring 18 accommodated in an adjusting screw 19 and capable of being stressed thereby at will.

The mode of operation of this system is as follows. The pressure in line 2 is propagated unchanged via line 4 to the trailer brake cylinders 5. In pressureless condition of control member 8, the closure member 12 rests on seat 14. As the spring 9 is not under stress, actuation of the brake control is attended immediately by displacement of control member 8 without time lag, whereby the ball is lifted from its seat by rod 17 and flow is thus admitted to space 20 and line 6, namely to the tractor brake cylinders. Thus both the trailer and the tractor brakes respond at once. Owing to support of pistons 8 and 15 on springs 9 and 16, the result is a relationship, depending on the spring characteristic, between tractor and trailer brake pressures. For linear spring characteristic, a constant pressure ratio is obtained. The degree of pressure reduction in space 20 relative to line 2 depends on the spring characteristic and can be varied by its means. In this way, the regulator serves merely to regulate the tractor brake pressure between 0 to 100% of the trailer brake pressure.

The advantages afforded by the invention are realized when the spring complex 16—either in the form of a helical spring of variable pitch or in the form of a set of disc springs comprising several groups of springs in series with different numbers of discs—is designed as a progressively acting spring. In that case, at low brake pressure there will be an extensive pressure reduction, since the weakest elements of the spring system as a whole will respond. With rising brake pressure, however, the spring action will stiffen according to the form of characteristic curve, so that the pressure reduction in space 20 of the regulator relative to line 2 will become less. With increasing pressure, the ratio of tractor brake pressure to trailer brake pressure increases, until finally it approaches a value of 1 and may in some instances actually reach it. Accordingly, as the spring elements have a continuous or broken characteristic, the relationship between trailer brake pressure and tractor brake pressure will likewise be continuous or broken. Notwithstanding the progressive characteristic of spring system 16, a load effect can be secured by introduction or withdrawal of spring 18.

What we claim is:

1. In a brake system for trains or vehicles comprising a tractor vehicle brake system and a trailer vehicle brake system, a pressure regulator therebetween, said pressure regulator comprising in combination with said brake systems a regulator housing; a cylindrical bore in said housing provided with a shoulder substantially centrally thereof; an inlet at one end of said cylinder for connecting same with a source of pressure; a control member slidably movable in said cylindrical bore, adjacent said inlet, said control member being provided with a bore extending axially therethrough and formed with a seat for receiving a closure member; a closure member in said bore; a spring between said shoulder and the control member urging same towards the said inlet; a spring in said bore urging said closure member against said seat; a piston at the other end of said cylinder; a piston rod secured to said piston and extending through said cylindrical bore in said control member; spring means in said cylinder contacting said piston for urging said rod to lift said closure member; an outlet in said cylinder between said closure member and said piston for connection with the tractor vehicle brake system; an outlet communicating with said inlet for connection with the trailer vehicle brake system.

2. In a brake system for trains or vehicles comprising a tractor vehicle brake system and a trailer vehicle brake system, a pressure regulator therebetween, said pressure regulator comprising in combination with said brake systems a regulator housing; a cylindrical bore in said housing provided with a shoulder substantially centrally thereof; an inlet at one end of said cylinder for connecting same with a source of pressure; a control member slidably movable in said cylindrical bore, adjacent said inlet, said control member being provided with a bore extending axially therethrough and formed with a seat for receiving a closure member; a closure member in said bore, a spring between said shoulder and the control member urging same towards the said inlet; a spring in said bore urging said closure member against said seat; a piston at the other end of said cylinder; a piston rod secured to said piston and extending through said cylindrical bore in said control member; spring means in said cylinder contacting said piston for urging said rod to lift said closure member; means in said cylinder for adjusting the pressure of said spring means; an outlet in said cylinder between said closure member and said piston for connection with the tractor vehicle brake system; an outlet communicating with said inlet for connection with the trailer vehicle brake system.

3. In a brake system for trains or vehicles comprising a tractor vehicle brake system and a trailer vehicle brake system, a pressure regulator therebetween, said pressure regulator comprising in combination with said brake systems a regulator housing; a cylindrical bore in said housing provided with a shoulder substantially centrally thereof; an inlet at one end of said cylinder for connecting same with a source of pressure; a control member slidably movable in said cylindrical bore, adjacent said inlet, said control member being provided with a bore extending axially therethrough and formed with a seat for receiving a closure member; a closure member in said bore; a spring between said shoulder and the control member urging same towards the said inlet; a spring in said bore urging said closure member against said seat; a piston at the other end of said cylinder; a piston rod secured to said piston and extending through said cylindrical bore in said control member; spring means in said cylinder contacting said piston for urging said rod to lift said closure member; means in said cylinder for adjusting the pressure of said spring means, said adjusting means consisting of a threaded screw member in said cylindrical bore receiving said spring means.

4. In a brake system for trains or vehicles comprising a tractor vehicle brake system and a trailer vehicle brake system, a pressure regulator therebetween, said pressure regulator comprising in combination with said brake systems a regulator housing; a cylindrical bore in said housing provided with a shoulder substantially centrally thereof; an inlet at one end of said cylinder for connecting same with a source of pressure; a control member slidably movable in said cylindrical bore, adjacent said inlet, said control member being provided with a bore extending axially therethrough and formed with a seat for receiving a closure member; a closure member in said bore, a spring between said shoulder and the control member urging same towards the said inlet; a spring in said bore urging said closure member against said seat; a piston at the other end of said cylinder; a piston rod secured to said piston and extending through said cylindrical bore in said control member; spring means in said cylinder contacting said piston for urging said rod to lift said closure member, said spring means comprising a helical spring of variable pitch and disc springs in series therewith; an outlet in said cylinder between said closure member and said piston for connection with the tractor vehicle brake system; an outlet communicating with said inlet for connection with the trailer vehicle brake system.

References Cited in the file of this patent

UNITED STATES PATENTS

| 2,135,003 | Harrison | Nov. 1, 1938 |
| 2,367,115 | Goepfrich | Jan. 9, 1945 |
| 2,479,232 | Gunderson | Aug. 16, 1949 |
| 2,725,073 | Edge et al. | Nov. 29, 1955 |

FOREIGN PATENTS

| 732,955 | Great Britain | June 29, 1955 |